United States Patent
Lapaille et al.

(10) Patent No.: US 7,184,775 B2
(45) Date of Patent: Feb. 27, 2007

(54) TELECOMMUNICATION SYSTEM IN WHICH EACH TERMINAL INCLUDES A PLURALITY OF CONNECTIONS

(75) Inventors: Cédric Lapaille, Chatou (FR); Francis Bourriaud, Longjumeau (FR); Pierre Parmentier, Saclay (FR); Christophe Gerrier, Bois-Colombes (FR)

(73) Assignee: Alcatel, Paris (FR)

( * ) Notice: Subject to any disclaimer, the term of this patent is extended or adjusted under 35 U.S.C. 154(b) by 1049 days.

(21) Appl. No.: 09/808,025

(22) Filed: Mar. 15, 2001

(65) Prior Publication Data

US 2001/0034241 A1   Oct. 25, 2001

(30) Foreign Application Priority Data

Mar. 16, 2000  (FR)  ................................. 00 03370

(51) Int. Cl.
*H04Q 7/20* (2006.01)
(52) U.S. Cl. .................. 455/452.2; 455/464; 370/230; 370/330; 370/468; 709/235
(58) Field of Classification Search ........ 455/449–453, 455/464, 560, 509; 370/395.1, 395.21, 395.4–395.43, 370/431, 348, 230, 337, 229, 235, 236–236.2, 370/468, 412, 281, 333, 329, 342, 538, 231, 370/232, 330; 725/126; 709/235
See application file for complete search history.

(56) References Cited

U.S. PATENT DOCUMENTS

| | | | | |
|---|---|---|---|---|
| 4,785,450 A | * | 11/1988 | Bolgiano et al. ............ 370/329 |
| 5,327,576 A | * | 7/1994 | Uddenfeldt et al. ........ 370/333 |
| 5,699,361 A | * | 12/1997 | Ding et al. .................. 370/431 |
| 5,708,660 A | | 1/1998 | Riedel |
| 5,734,652 A | * | 3/1998 | Kwok ...................... 370/395.2 |
| 5,812,525 A | * | 9/1998 | Teraslinna ................... 370/229 |
| 5,917,822 A | * | 6/1999 | Lyles et al. .............. 370/395.4 |
| 5,940,763 A | * | 8/1999 | Alperovich et al. ........ 455/450 |
| 6,072,800 A | * | 6/2000 | Lee ............................. 370/412 |
| 6,160,823 A | * | 12/2000 | Saintot ....................... 370/538 |
| 6,496,490 B1 | * | 12/2002 | Andrews et al. ............ 370/329 |

(Continued)

FOREIGN PATENT DOCUMENTS

EP  0 774 848 A2  5/1997

(Continued)

*Primary Examiner*—Fan Tsang
*Assistant Examiner*—M S A Elahee
(74) *Attorney, Agent, or Firm*—Sughrue Mion, PLLC

(57) ABSTRACT

A telecommunication system in which a plurality of terminals communicate with a base station or a connection station and a management unit determines the allocation of resources for calls from each terminal to the connection station. At least some of the terminals include a plurality of connections. Calls are effected by means of cells or packets. The allocation of resources is determined cell by cell or packet by packet in each connection. The management unit allocates communication resources to each terminal according to the total number of cells or packets waiting in each terminal and a weighting coefficient allocated to each terminal. The allocation of resources by the management unit is independent of the number of connections of each terminal. Each terminal allocates resources to each connection according to the overall resources allocated to it by the management unit and a weighting coefficient allocated to each connection of the terminal.

15 Claims, 1 Drawing Sheet

U.S. PATENT DOCUMENTS

| | | | |
|---|---|---|---|
| 6,553,033 B1 * | 4/2003 | Wallmeier | 370/395.4 |
| 6,560,243 B1 * | 5/2003 | Mogul | 370/468 |
| 6,563,829 B1 * | 5/2003 | Lyles et al. | 370/395.21 |
| 6,594,245 B1 * | 7/2003 | Rimhagen et al. | 370/337 |
| 6,597,682 B1 * | 7/2003 | Kari | 370/348 |
| 6,628,633 B1 * | 9/2003 | Mochizuki | 370/335 |
| 6,657,983 B1 * | 12/2003 | Surazski et al. | 370/337 |
| 6,661,781 B1 * | 12/2003 | Chitre et al. | 370/330 |
| 6,704,932 B1 * | 3/2004 | Matsunaga et al. | 725/126 |
| 6,760,305 B1 * | 7/2004 | Pasternak et al. | 370/230 |
| 6,795,865 B1 * | 9/2004 | Bahl et al. | 709/235 |
| 2004/0203743 A1 * | 10/2004 | Macridis et al. | 455/427 |

FOREIGN PATENT DOCUMENTS

| | | |
|---|---|---|
| WO | WO 9909689 A1 * | 2/1999 |
| WO | WO 99/44379 | 9/1999 |

\* cited by examiner

TELECOMMUNICATION SYSTEM IN WHICH EACH TERMINAL INCLUDES A PLURALITY OF CONNECTIONS

BACKGROUND OF THE INVENTION

1. Field of the Invention

The invention relates to a digital telecommunication system in which each terminal communicates via a base station also referred to as a connection station. It also relates to a method of allocating communication resources in a digital telecommunication system in which each terminal communicates via a base station also referred to as a connection station and to a terminal and means for managing the system.

2. Description of the Prior Art

Telecommunication systems such as mobile telephone systems and satellite telecommunication systems are based on dividing a territory into geographical areas.

In the case of a mobile telephone system, the geographical areas are generally referred to as cells and their dimensions vary according to their location, being small in an urban area and larger in a rural area. In a mobile telephone system the terminals, in other words the mobile transmitters and receivers, communicate with each other or with terminals of other networks via a base station provided in each area.

In the case of a geosynchronous or non-geosynchronous satellite telecommunication system, at least a major part of the Earth is divided into areas each of which has a diameter of the order of several hundred kilometers and the fixed or mobile terminals communicate via a connection station, also referred to as a management station, in that area, calls being relayed by equipment on board a satellite.

In geosynchronous and non-geosynchronous satellite telecommunication systems, the information transmitted is in digital form and is grouped into cells, also referred to as packets, that conform to the ATM standard, for example.

Each area is allocated communication resources consisting of frequencies and/or codes. If terminals are communicating simultaneously with the base station or connection station separate resources are allocated to each terminal to prevent interference between terminals transmitting simultaneously and so that the station can determine the origin of the cells or packets. In addition to frequencies and/or codes, the resources generally include a time position for each cell or packet. It is therefore necessary to provide a centralized resource management unit in each area whose function is to allocate communication resources to each terminal.

If each terminal can send and receive information of different types, that is to say having different qualities of service, the central management unit allocates resources to each terminal according to its quality of service. If a terminal can set up several connections simultaneously, resources are allocated to each connection.

For the central management unit to be able to know the requirements of each terminal, and possibly of each connection, the terminals must send it signaling information.

If the calls are in circuit-switched mode, that is to say if resources are allocated when a connection is set up, the quantity of information to be transmitted to the management unit remains moderate.

However, it is preferable for the resources to be allocated cell by cell or packet by packet to optimize the distribution of resources at any given time. In this case, the signaling information transmitted from the terminals to the management unit is voluminous. Also, the greater the number of connections and qualities of service per terminal, the greater the quantity of signaling.

The invention provides a system and a method for minimizing the signaling necessary for allocating resources.

In the above telecommunication systems the methods for allocating resources used until now cannot correctly isolate the flows of data between terminals, sporadic traffic in some terminals having an effect on the continuous traffic of other terminals, for example. Also, the prior art methods cannot always distribute communication resources equitably between the terminals and jitter between the incoming and outgoing flows can be prohibitive. The term "jitter" refers to the accuracy of the time at which the flows to be transmitted are transmitted. If that accuracy is not sufficient, the transmission of some data is interfered with, for example real time video transmission.

Another aspect of the invention ensures correct isolation between flows from different terminals, equitable distribution of resources between terminals and low jitter on transmission.

SUMMARY OF THE INVENTION

The invention provides a telecommunication system in which a plurality of terminals communicate with a base station or a connection station and a management unit determines the allocation of resources for calls from each terminal to the connection station, at least some of the terminals include a plurality of connections, the calls are effected by means of cells or packets, the allocation of resources is determined cell by cell or packet by packet in each connection, the management unit includes means for allocating communication resources to each terminal according to the total number of cells or packets waiting in each terminal and a weighting coefficient allocated to each terminal, the allocation of resources by the management unit is independent of the number of connections of each terminal, and each terminal includes means for allocating resources to each connection according to the overall resources allocated to it by the management unit and a weighting coefficient allocated to each connection of the terminal.

Accordingly, each terminal transmits to the management unit responsible for the distribution of resources only the total number of cells or packets waiting. In other words, it is not necessary for each terminal to transmit the number of cells or packets awaiting transmission for each of its connections and the quality of service allocated to each connection. Each terminal therefore sends to the management unit information that can be independent of the number of connections of that terminal and the qualities of service allocated to the connections.

The quality of service allocated to each terminal is determined once and for all when each connection of the terminal is installed, for example, in the form of configuration parameters. In can also be modified during connection.

In a preferred embodiment of the invention the means for distributing resources between terminals in the management unit and/or the means for distributing resources between connections in each terminal are of the weighted fair queuing (WFQ) type. Such means allocate a waiting coefficient or a pass-band to each terminal. This embodiment provides correct isolation between flows, an equitable distribution and low jitter on transmission.

In one embodiment, the weighting coefficient allocated to each terminal is the sum of the weighting coefficients allocated to each connection of the terminal.

The management unit preferably includes means for allocating to each terminal a number of cells to be transmitted and the start and end of transmission times for the terminal.

In one embodiment the weighting coefficient allocated to each terminal determines the required time period between successive transmission times for the terminal.

The weighting coefficient allocated to each connection of a terminal advantageously determines the time period between the transmission times of two successive cells of the connection.

The invention also provides a terminal for a telecommunication system in which calls are effected by cells or packets, wherein the terminal includes a plurality of connections, the allocation of resources is determined cell by cell or packet by packet, the terminal includes means for transmitting to a management unit responsible for allocating resources to a plurality of terminals a signal representing the total number of cells or packets awaiting transmission, means for periodically receiving from the management unit a signal representing the communication resources allocated to the terminal, and means for allocating the resources to each connection according to the overall resources that are allocated to it and a weighting coefficient allocated to each connection of the terminal.

The signal representing the number of cells or packets to be transmitted is transmitted periodically or irregularly. However, in the latter case, the period between two successive transmissions is preferably less than a predetermined limit.

The invention also provides a management unit for allocating communication resources to a plurality of terminals of a telecommunication system in which calls are effected by cells or by packets, at least some of the terminals include a plurality of connections, the resources are allocated cell by cell or packet by packet, and the unit includes means for receiving from each terminal a symbol representing the total number of cells or packets awaiting transmission, means for allocating the communication resources for the terminal according to the number of waiting cells or packets and a weighting coefficient allocated to each terminal, and means for transmitting resource allocation messages to each terminal.

Other features and advantages of the invention will become apparent from the following description of embodiments of the invention, which is given with reference to the accompanying drawings.

DETAILED DESCRIPTION OF THE PREFERRED EMBODIMENT

Figure 1:
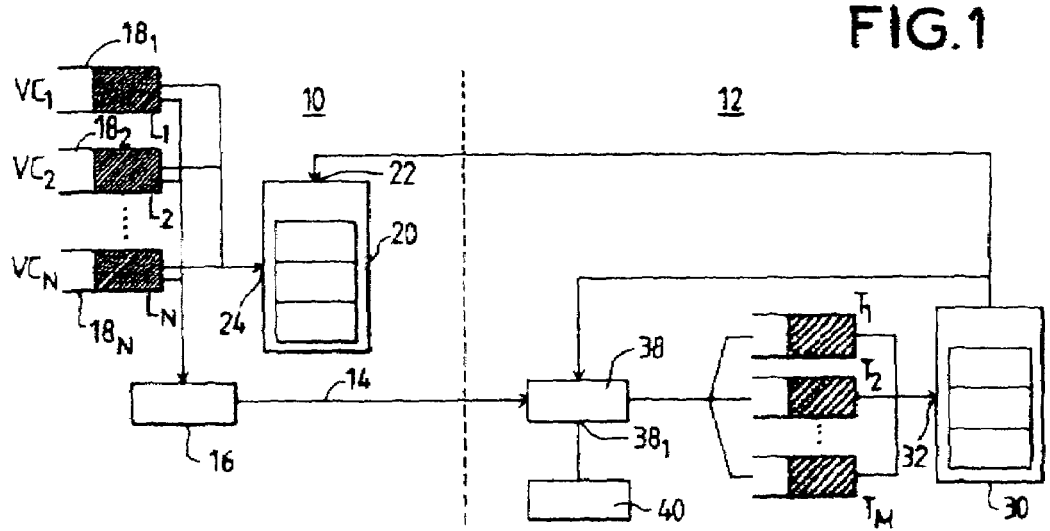
FIG. 1 is a block diagram of a telecommunication system according to the invention showing a management station and a terminal.
Figure 2:
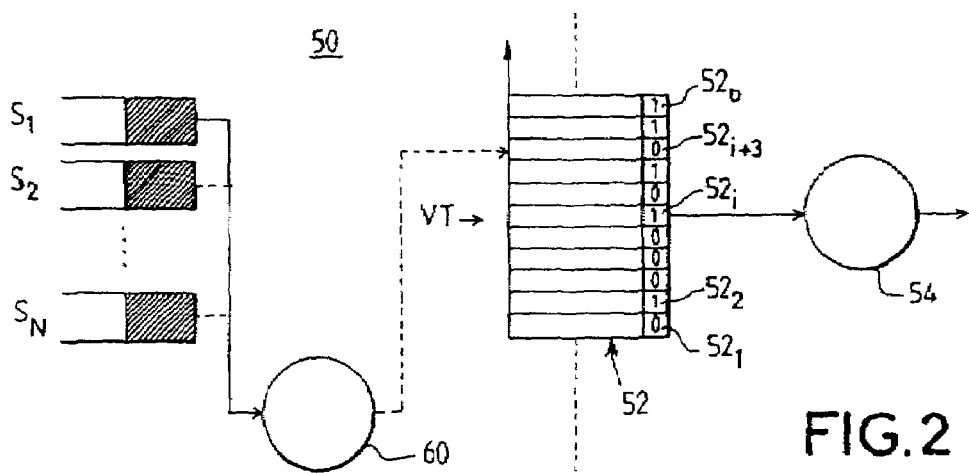
FIG. 2 is a diagram showing resource allocation means.

The telecommunication system to be described by way of example with reference to FIGS. 1 and 2 employs non-geosynchronous satellites (not shown). In this system, the Earth is divided into areas each of which has a diameter of the order of a few hundred kilometers. A base station, also referred to as a management station, is provided in each area, for example at the center of the area, and fixed or mobile terminals in the area communicate via the management station. Each terminal communicates with the station via equipment on board the satellite that can be seen from the area. The satellites form a constellation such that when one satellite moves out of view from the area concerned another satellite takes over from it.

In this telecommunication system, each terminal 10 (FIG. 1) can transmit and receive on a plurality of connections $VC_1, VC_2 \ldots VC_N$. Each connection has a quality of service associated with it. There are four qualities of service, for example:

The first is a constant bit rate (CBR) quality of service which guarantees a maximum time-delay of 100 ms (for example) between transmission and reception. This quality of service is provided in particular for telephone calls and facsimile transmission.

The second quality of service is for variable bit rate real time (VBR-RT) calls having less severe time-delay constraints. In this case and in this example there is a maximum time-delay of 400 ms. This type of call can be used for videoconferences in particular.

The third quality of service is for variable bit rate calls that are not in real time (VBR-NRT). However, a minimum bit rate is provided for this type of call. It is used to consult Internet pages, for example.

The fourth quality of service is the unspecified bit rate (UBR) quality of service that guarantees neither a minimum time-delay nor a minimum call density. This type of call can be used for electronic mail.

Allocating a quality of service to each call or connection maximizes the resources of the asynchronous transmission network. The asynchronous transmission of packets enables a given physical transmission medium to transmit calls of lower priority during periods of silence in calls of higher priority.

In this example calls transmitted from the terminals are of the digital, for example ATM, type. In an asynchronous network of this kind the data is organized into packets also referred to as cells and including 384 data bits and 40 header bits in the case of the ATM standard. The cells transmitted from the terminals are grouped into frames each of which has a duration of 32 ms.

Figure 1A:
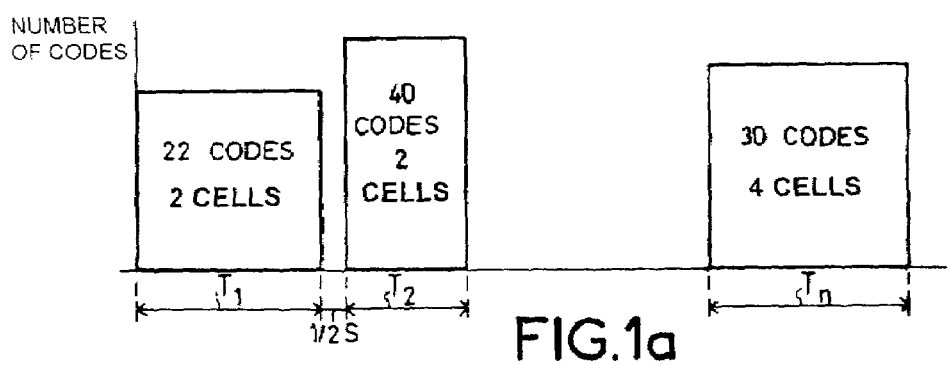
FIG. 1a is a diagram showing cells transmitted by terminals.

In each frame, the resources allocated to each terminal consist of time slots and codes, as shown in FIG. 1a. In the diagram time is plotted on the abscissa axis and the codes are plotted on the ordinate axis. The resources allocated to the terminals 1, 2 . . . n are represented by rectangles. Thus, for terminal 1, two ATM cells are transmitted during a time slot $T_1$ and those two cells are allocated 22 codes. The slot $T_1$ corresponds to a particular number of symbols.

The second terminal is allocated a time slot $T_2$ shorter than the time slot $T_1$, two cells to be transmitted and 40 codes. The time intervals between the end of transmission by terminal 1 and the beginning of transmission by terminal 2 is approximately half of a symbol period.

The nth terminal transmits four cells during a time slot $T_n$ and is allocated 30 codes.

The telecommunication system includes a central management station 12 for allocating communication resources to each connection of each terminal. The station 12 is in the same location as the base station or at a different location.

To limit signaling between the terminals 10 and the central station 12, the invention divides the resource allocation functions between the station 12 and each terminal.

In the present context, the term "resource" refers to the time resources and to the other resources used to communicate: calls can be set up on a plurality of carrier frequencies and a code can be allocated to each call or each cell or packet at each carrier frequency.

The allocation of the resources is determined by the station 12 for each terminal independently of each of the connections provided in each of the terminals and is effected periodically, packet by packet, and not in circuit mode. In each terminal resources are allocated cell by cell.

To be more precise, in the example, the central station 12 determines periodically for each terminal a total number of cells that the terminal is authorized to transmit and the transmission start and end times for each terminal. The resource allocation period is sufficiently short for the resources to be allocated cell by cell in each connection. It is 10.66 ms in the example.

Accordingly, as shown in FIG. 1a, the station 12 issues an authorization to transmit two cells for terminal 1, an authorization for two cells to terminal 2 and an authorization for four cells to terminal n. The station 12 also determines the transmission start and end times for the groups of cells transmitted by each terminal.

The number of cells allocated to each terminal depends on a weighting coefficient allocated to each terminal and the total number of cells waiting to be transmitted in each terminal. The weighting coefficient allocated to each terminal depends on the global quality of service allocated to the terminal.

Consider the example of two terminals each of which must transmit 30 cells when the transmission of a total of 30 cells is authorized for both terminals. If the first terminal has a "weight" of 144 kbit/s and the second a "weight" of 36 kbit/s, the first terminal can transmit 24 cells and the second terminal can transmit six cells.

It is therefore clear that the weight, or the weighting coefficient, preferably corresponds to a bit rate or to its reciprocal.

Each terminal includes a signaling terminal 14 which transmits to the station 12 a signal representing the total number of cells waiting in the terminal.

The terminal is therefore providing with means 16 to determine the level to which is filled each of the queues of the connections $VC_1$ $VC_2$ ... $VC_N$, i.e. the number $L_1$, $L_2$ ... $L_N$ of cells waiting in each of the queues, respectively $18_1$ $18_2$ ... $18_N$, and the means 16 sum the values $L_1$, $L_2$ ... $L_N$. The sum signal is transmitted over the signaling channel 14 to the station 12.

In this example, the weighting coefficient allocated to each terminal $t_1, t_2 \ldots t_m$ is equal to the sum of the weighting coefficients of each of the connections of the terminal.

In each terminal, resources are allocated by a system 20 having an input 22 receiving from the station 12 information on the resources globally allocated to the terminal 10, namely the number of cells to be transmitted and the transmission start and end times.

The system 20 has another input 24 receiving information on the waiting cells of each of the connections $VC_1$, $VC_2$ ... $VC_N$ in the respective queues $18_1$, $18_2$ ... $18_N$.

The system 20 determines the cells that will be transmitted using a WFQ method which allocates to each connection $VC_1$, $VC_2$ ... $VC_N$ a weighting coefficient that depends on the quality of service of each connection. To be more precise, the coefficient determines the pass-band allocated to each connection or the time shift between the transmission times of two cells of the same connection. For example, if the coefficient allocated to a connection is $r_i$, the time between transmission of two successive cells on that same connection is approximately $1/r_i$.

One example of a system using the WFQ method will be described later with reference to FIG. 2.

The station 12 also includes a WFQ device 30 for determining the resources distributed to each terminal. Although the devices 20 (for the terminal) and 30 (for the management unit) are of the same type, the device 30 is significantly more complex than the device 20. The device 30 must generally manage several thousand terminals whereas the device 20 manages a much smaller number of connections, for example less than ten connections.

Accordingly, the device 20 can be implemented in the form of a program installed in a microprocessor and occupying a relatively small memory space. In other words, the device 20 entails a negligible increase to the cost of producing each terminal.

As shown in FIG. 1, the device 30 has an input 32 receiving information relating to the states of the queues in each terminal. In the FIG. 1 diagram, those states are provided by buffers $T_1, T_2 \ldots T_M$, of which there is one for each terminal, which are filled with the data received from the various terminals via the signaling channels 14. The data is received in a block 38 before transmission to the buffers $T_1, T_2 \ldots T_M$.

The block 38 has an input $38_1$ receiving request signals transmitted by an automatic request generator 40 which controls the multiplexing of the data from the block 38 to the buffers $T_1, T_2 \ldots T_M$.

FIG. 2 shows a WFQ device 50 for controlling the transmission of cells or packets and is used to explain the operating principle of the device 20 of each terminal and/or the device 30 in each station.

To simplify the explanation, the operation of a terminal WFQ device is described.

The device 50 controls the transmission of cells (or packets) from N flows $S_1, S_2 \ldots S_N$ of cells each of which is allocated a respective coefficient $r_1, r_2 \ldots r_N$ depending on the quality of service allocated to that flow.

The device 50 includes a scheduler 52 which takes the form of a circular memory comprising registers $52_i \ldots 52_n$ which are scanned in sequence. Each register corresponds to one time slot representing the time needed to transmit a cell on the output link, i.e. the product of the bit rate of the link by the size of the cell. In the example, the current time VT corresponds to the register $52_i$. The latter register is therefore scanned first. The register $52_{i+1}$ is scanned next, and so on up to register $52_p$. After register $52_p$ is read, the next register to be read is the register $52_1$, and so on.

Each of the registers contains one or more cells, or the address of that cell or cells, to be transmitted at the time corresponding to the position of the register. The register also contains a bit at 0 or 1 indicating whether the register is full or not (with an address or several addresses, or a cell or several cells).

When a scanning pointer reaches the register $52_i$ corresponding to the current time VT the cells corresponding to that register are introduced into a queue 54, for example a FIFO buffer. The cells are then transmitted sequentially.

At the output of the buffer 54, when a cell $a_i$ from a flow $S_i$ has been transmitted from the buffer 54 to the station 12, the first waiting cell of the flow $S_i$ is introduced into a register, for example the register $52_{i+3}$.

To determine the register into which each cell (or its address) must be inserted, i.e. the time of its transmission, each cell is allocated a time "label" by a device 60. To comply with the pass-band allocated to each connection, the required time of transmission of each cell is the time $t_i$ of transmission by the register 54 of the preceding cell $a_i$ plus the quantity $1/r_i$ so that the next cell of the same connection is transmitted at time $t_i+1/r_i$. Under these conditions, the next cell (or its address) from the register $S_i$ fills an empty register or a register that is already filled.

If the time label allocated to the next cell is written at a time later than that which corresponds to the sum $t_i+1/r_i$, then the time label is VT (the current time of the scheduler 52). The cell is therefore transmitted virtually immediately. This situation arises if the cell is subject to a time-delay caused by preceding nodes in the network. Under these conditions, if the cell is delayed relative to its required retransmission time, the cell will be transmitted immediately, i.e. placed at time $V_T$, in order not to increase the time-delay.

The invention claimed is:

1. A telecommunication system comprising:
a plurality of terminals which communicate with a base station or a connection station; and
a management unit which determines the allocation of resources for calls from each terminal to said connection station, wherein at least some of said terminals include a plurality of incoming connections providing cells or packets used to effect said calls to said connection station, the allocation of resources is determined cell by cell or packet by packet in each connection, said management unit includes means for allocating communication resources to each terminal according to the total number of cells or packets waiting in each terminal and a weighting coefficient allocated to each terminal, the allocation of resources by said management unit is independent of the number of connections of each terminal, and each terminal includes means for allocating resources to each connection according to the overall resources allocated to said terminal by said management unit and a weighting coefficient allocated to each connection of said terminal.

2. The system claimed in claim 1 wherein said weighting coefficient allocated to each connection in a terminal depends on the quality of service of said connection.

3. The system claimed in claim 1 wherein said weighting coefficient allocated to each terminal is the sum of weighting coefficients allocated to each connection of said terminal.

4. The system claimed in claim 1 wherein said management unit includes means for allocating to each terminal a number of cells to be transmitted and the start and end of transmission times for said terminal.

5. The system claimed in claim 1 wherein said weighting coefficient allocated to each terminal determines the required time period between successive transmission times for said terminal.

6. The system claimed in claim 1 wherein said weighting coefficient allocated to each connection of a terminal determines the time period between the transmission times of two successive cells of said connection.

7. A terminal for a telecommunication system in which calls are effected by cells or packets, and the allocation of resources is determined cell by cell or packet by packet, said terminal comprising:
a plurality of incoming connections providing the cells or the packets used to effect the calls to the a connection station, means for transmitting to a management unit responsible for allocating resources to a plurality of terminals a signal representing the total number of cells or packets awaiting transmission,
means for periodically receiving from said management unit a signal representing the communication resources allocated to said terminal, and
means for allocating the resources to each connection according to the overall resources that are allocated to said terminal and a weighting coefficient allocated to each connection of said terminal.

8. The terminal claimed in claim 7 wherein said resource allocation signal that is received from said management unit represents a number of cells to be transmitted and the start and end of transmission times for the group of cells to be transmitted and said means for allocating resources to each connection select the connections that will be able to transmit a cell.

9. The terminal claimed in claim 7 wherein said resource allocation signal received from said management unit represents a number of cells to be transmitted and the start and end of transmission times for the group of cells to be transmitted and said means for allocating resources to each connection include means for determining the transmission time of each cell.

10. The terminal claimed in claim 7 wherein said weighting coefficient allocated to each connection depends on the quality of service of that connection.

11. The terminal claimed in claim 7 including means for transmitting two successive cells of the same connection at times separated by a time period that depends on the weighting coefficient allocated to said connection.

12. The terminal claimed in claim 11 wherein said time period between the transmission of two successive cells of the same connection depends on the reciprocal of the weighting coefficient allocated to the corresponding connection.

13. A management unit for allocating communication resources to a plurality of terminals of a telecommunication system in which calls are effected by cells or by packets, wherein at least some of said terminals include a plurality of incoming connections providing the cells or the packets used to effect said calls to said a connection station and means for allocating resources to each connection according to the overall resources allocated to at least some of said terminals by said management unit and a weighting coefficient allocated to each connection of said terminals, and said resources are allocated cell by cell or packet by packet, said unit comprising means for receiving from each terminal a symbol representing the total number of cells or packets awaiting transmission, means for allocating the communication resources for said terminals according to said number of waiting cells or packets and a weighting coefficient allocated to each terminal, and means for transmitting resource allocation messages to each terminal.

14. The management unit claimed in claim 13 wherein said means for allocating resources to each terminal include means for determining the number of cells or packets to be transmitted by each terminal and the start and end of transmission times for each terminal.

15. The management unit claimed in claim 13 wherein said weighting coefficient allocated to each terminal determines the time period between successive transmission times for said terminal.

* * * * *